Dec. 27, 1960 N. D. LOGAN 2,966,127
CONFECTIONARY MOLD
Filed July 7, 1958 3 Sheets-Sheet 1
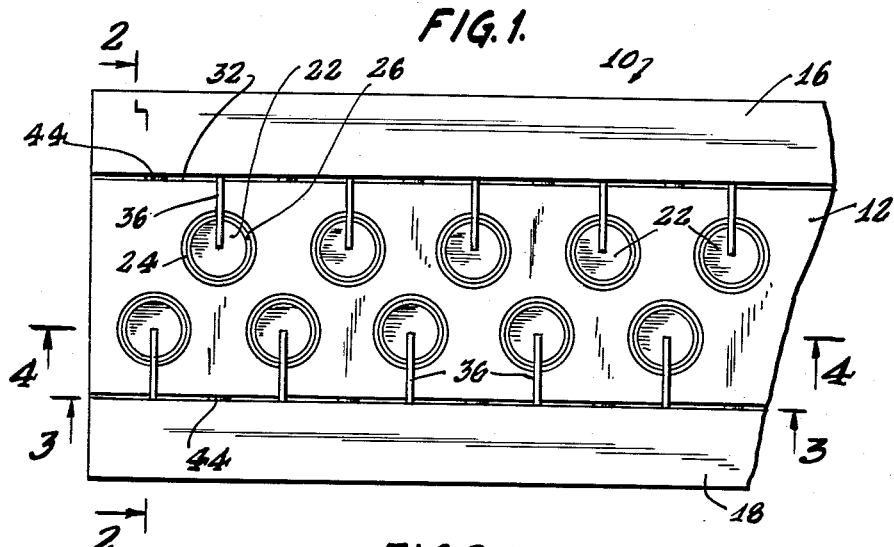
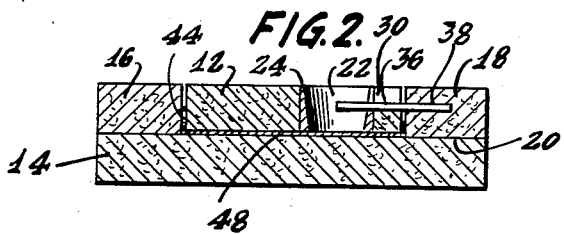
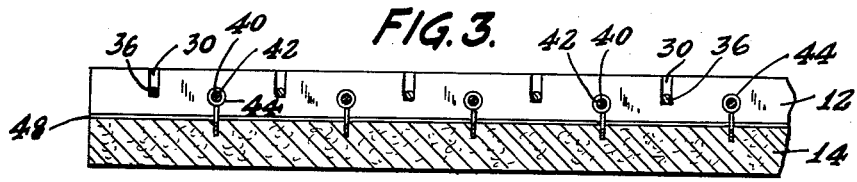
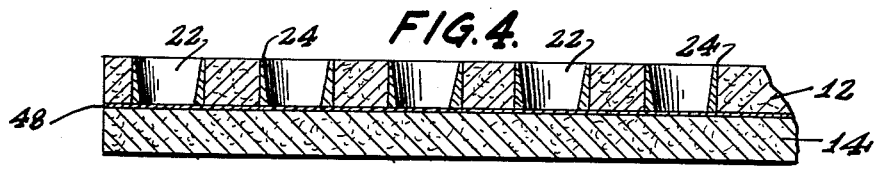
INVENTOR.
NICHOLAS D. LOGAN
BY James H. Conner
AGENT.

Dec. 27, 1960  N. D. LOGAN  2,966,127
CONFECTIONARY MOLD
Filed July 7, 1958  3 Sheets-Sheet 2
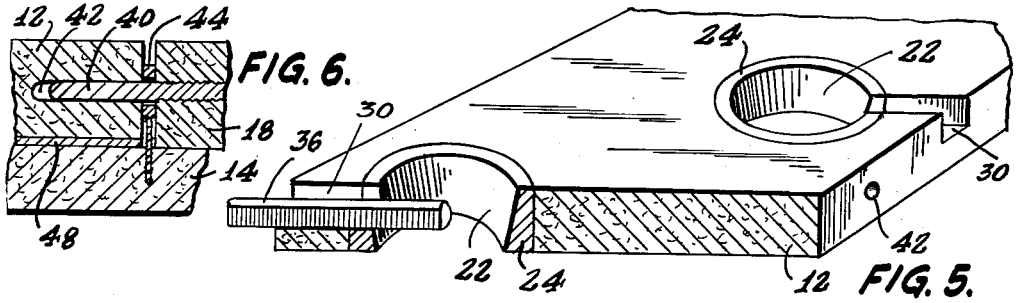
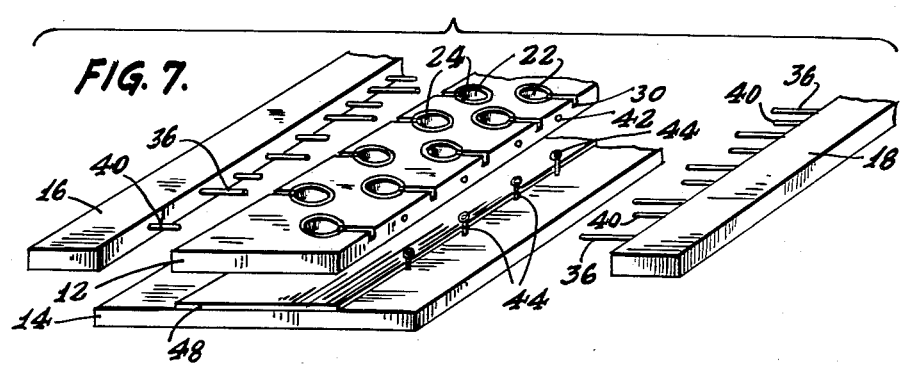
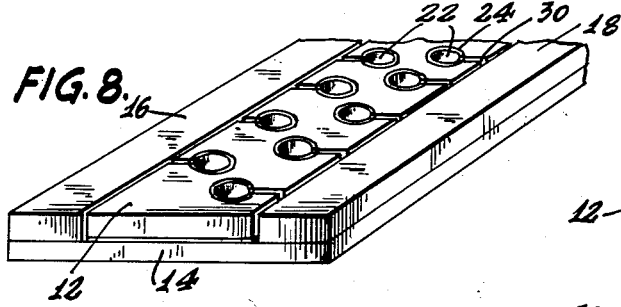
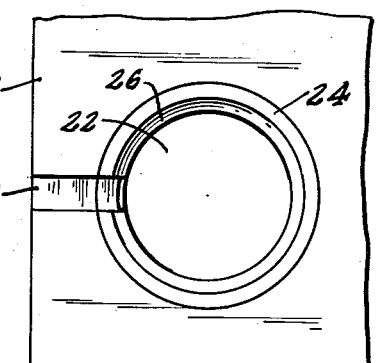
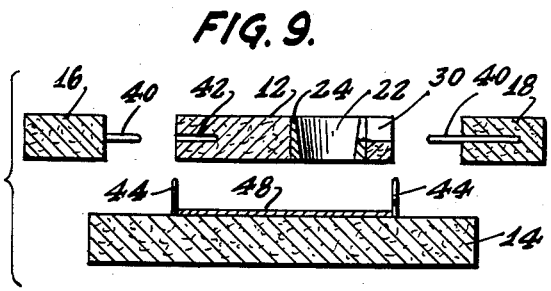
INVENTOR.
NICHOLAS D. LOGAN
BY
AGENT.

Dec. 27, 1960

N. D. LOGAN 2,966,127

CONFECTIONARY MOLD

Filed July 7, 1958

INVENTOR.
NICHOLAS D. LOGAN

BY

AGENT.

United States Patent Office 2,966,127
Patented Dec. 27, 1960

2,966,127

CONFECTIONARY MOLD

Nicholas D. Logan, Williston Park, N.Y.
(163 Primrose Road, Nassau, N.Y.)

Filed July 7, 1958, Ser. No. 746,783

3 Claims. (Cl. 107—19)

This invention relates generally to confectionary molds and in particular to a novel confectionary mold primarily designed for minimum quantity batches that are practical and economical to the small enterprise manufacturer.

Heretofore, prior confectionary manufacturing devices were complex, expensive, and customarily inefficient. Such devices generally required several components that further increased the cost thereof and increased the operator labor necessary to complete the molding process before the confectionary material prematurely hardened into an un-usable consistency. Further, the large manufacturer generally utilized equipment that pressed rather than molded the confection onto the stick.

The large manufacturer used the pressing and cutting equipment to economically make lollypops or confection of the sugar-base type. Chocolate pops require the use of molds and accordingly cannot be manufactured with the equipment generally utilized by the large manufacturer. The present invention may be used to supplement the complex pressing equipment where the large manufacturer desires to make chocolate confection.

The present invention overcomes the disadvantages of the prior devices and further provides many advantages not heretofore available. In contrast to the complex, expensive, and inefficient nature of the pressing equipment or conventional molds, the present invention is easily manufactured, simple to use and extremely efficient. Essentially, the invention comprises a sectional mold formed from an inexpensive material having a plurality of individual mold cavities therein. Accordingly, one of the principal objects of the invention resides in the provision of a sectional confectionary device having a plurality of mold cavities therein.

Another object of the invention is to provide stick or handle supporting and guiding means for each of the plural cavities that are positioned relative thereto concurrently and prior to the confectionary pouring operation.

It may be pointed out that the present invention is intended for use by the small confectionary manufacturer having limited retailing means, i.e. the small retail confectionary store that manufactures confectionery in five or ten pound batches to make both sugar-base or chocolate confection. Obviously, large automatic machines may be more efficient. However, the cost thereof is prohibitive to the small one-store manufacturer retailer.

A further object of the present invention resides in the provision of means to lock the component stick supporting and guiding means in operative relation with the plural mold cavities so that agitation during pouring, where required, can not displace the sticks or accidentally disengage the components. Obviously, accidental separation of the mold components would result in a substantial, if not total, loss of the confection product.

Still another object of the invention resides in the provision of novel mold cavity structures having inherent means that facilitates the removal of the hardened sugar-base or chocolate confection.

Other ancillary objects will be in part hereinafter apparent and will be in part hereinafter pointed out.

In the drawings:

Figure 1 is a plan elevation of the assembled mold.

Figure 2 is a cross section taken along line 2—2 of Figure 1.

Figure 3 is a cross section taken along line 3—3 of Figure 1.

Figure 4 is a cross section taken along line 4—4 of Figure 1.

Figure 5 is an enlarged perspective detail showing in cross section an individual mold cavity construction.

Figure 6 is an enlarged detail of the mold assembly locking means.

Figure 7 is an exploded isometric projection of the component members of the mold.

Figure 8 is a perspective projection of the component members of the mold in assembled relation.

Figure 9 is an exploded transverse cross section of the mold members showing the interlocking relationship.

Figure 10 is a fragmentary plan elevation of a circular type mold.

Figure 11:
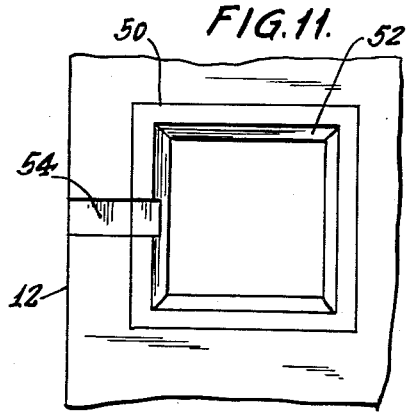
Figure 11 is a fragmentary plan elevation of a rectangular shaped mold cavity.
Figure 12:
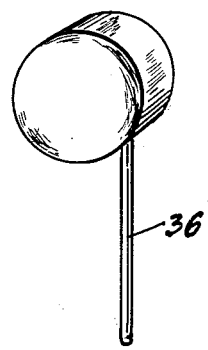
Figure 12 is a perspective view of the molded product that had been poured in a mold of the type shown in Figure 10.
Figure 13:
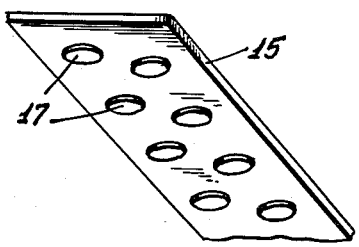
Figure 13 is a perspective view of a device for pressing confection out of the mold after casting and hardening.

Referring to the drawings in detail, 10 generally designates the present invention which comprises a mold having a center section 12, a base 14, and a pair of diametrically opposite end sections 16 and 18 respectively. Base section 14 may be formed of a substantially inexpensive material such as fibreboard having a polished surface 20 thereon. The polished surface 20 is substantially planar throughout its area for reasons hereinafter appearing. Adapted to reside in a central location on the base member 14 is the center section 12 which is similarly formed from a fibreboard material and is further provided with a plurality of mold cavities 22. Each of the mold cavities generally comprises a metallic insert 24 that may be formed from aluminum or similar material. Insert 24 is preferably formed from a metallic stock in a desired shape such as the circular embodiment as shown in Figures 1 through 10. This of course produces the conventional and well-known sugar-base lollypop. The insert is made with an internal tapered periphery 26 that extends throughout the depth thereof. The internal diametrical dimension of the lower-most part of the cavity 22 is less than the diametrical portion of the upper terminal. This tapered mold is provided to facilitate the removal of confection after the confection has been cast or poured into the mold and permitted to harden.

It is a conventional practice to provide a stick or handle to support the confection while it is being consumed. Accordingly, means are provided to position a stick or handle in the cavity so that the confection may be poured in the cavity and surround the portion of the stick that is disposed therein. Directed toward this end, each cavity 22 is provided with a slot 30 that extends radially therefrom and communicates and terminates at one end with the cavity 22 and terminates at the other end with the edge 32 of the mold center section 12. The slot 30 extends downwardly a sufficient distance to be disposed longitudinally therein and is of such depth as to position the stick 36 substantially midway of the depth of the cavity 22. To facilitate the positioning of the sticks 36 in the respective plurality of cavities, means are provided in the end sections 16 and 18 respectively to receive a similar plurality of sticks 36 therein. This means consists of a plurality of equally dimensioned bores 38 which extend transversely in spaced parallel relation within the respective end sections. Accordingly, each of the bores 38 receives therein a stick or handle 36 prior to the positioning of the respective end section in aligned relation with the associated cavity. To insure alignment, each of the end sections 16 and 18 has extending from the operational side thereof a plurality of pins 40 which are adapted to reside within co-aligning bores 42 in the center section 12. To insure the proper alignment of the respective end sections 16 and 18 with their related cavities, the pins 40 are spaced offset one from the other in aligned relation with the bores 42 so that each end section cannot be accidentally reversed. The bores 38, as previously described, are disposed in aligned relation with the slots 30 and each of the end sections is slightly differing in diametrical dimension. It will be noted from the drawing that the cavities 22 are disposed within the center section 12 in a staggered offset relation which provides for a maximum strength with a minimum surface area of the center section 12.

To secure the end sections 16 and 18 in aligned relation with the cavities, means are provided which substantially locks the center section 12 in a compressed relationship with the base 14. Directed toward this end it will be noted that there are provided a plurality of eyes 44 which are secured to and disposed in spaced relation longitudinally along the base member 14. The eyes 44 are so disposed to co-align with the pins 40 and when the end sections 16, 18, are assembled with the center section 12, the pins 40 pass through the eyes 44 and into the bores 42 and thereby secure the component members in assembled relation.

As herebefore described, the cavities are substantially apertures that are open on opposite surfaces of the member 12. The center section 12 and the side sections 16 and 18 are utilized in combination, during the casting of a molten sugar-base confection. Base member 14 is not required for the molding of the sugar type confection. In practice, the mold is laid on a marble slab and the molten sugar confection poured therein. When chocolate confection is to be cast or poured, the base 14 is employed as hereinafter described. Means are provided to seal the bottom openings of each of the mold apertures when the mold is disposed in assembled relation for chocolate casting. Directed toward this end, conventional polished paper 48 is disposed lengthwise along the center section of the upper surface of base 14. This paper is preferably of the Glassene type which does not adhere to chocolate confection. The center section 12 when assembled with its related components substantially abuts against the paper 48, thereby providing a seal that surrounds the bottom of each mold cavity.

Confection, to be economically feasible, is generally prepared in five or ten pound batches and accordingly must be poured within a predetermined period of time before the confection material hardens to an unpourable state. In operation, the present mold generally provides a plurality of cavities of a sufficient number that permits a practical quantity of confectionary pieces to be poured at one time. After a minimum hardening period the end sections 16, 18, are removed and the mold center section 12 can be lifted from the base 14 and the finished molded products manually pressed out of the cavities by means of a presser 15. Presser 15 has a plurality of matching protrusions 17 that engage the confection and eject it from the cavities.

It will be further noted that where the material that is being poured in the mold cavities requires agitation, such as chocolate, the assembled mold in its locked relation can be manually agitated without fear of accidental dislodgment of the components, resulting in a perfect casting.

While the popular choice of a confection is shown to be circular, a rectangular shaped mold, such as shown in Figure 11, may be utilized. The mold cavity is formed with a rectangular insert 50 that has an internal periphery 52 tapered in the manner herebefore described and which is similarly provided with a slot 54 that communicates with the interior of the cavity and the edge of the section 12. It is obvious that many different shapes could be utilized without departing from the principles of the invention. In fact, many differing shapes may be provided in a single mold section.

It will be noted that center section 12 is substantially locked to the side sections 16 and 18 by means of the pins 40 and co-aligning bores 42, thereby effectively securing sticks 36 in a controlled correct position in the cavities 22. Thus, the heavier molten confection material, when poured in the cavities, cannot raise, float, or dislodge the sticks.

Figure 14:
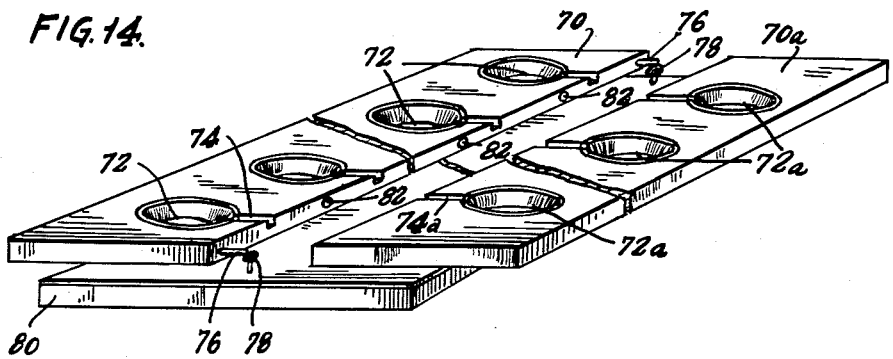
Figure 14 is an exploded perspective view of still a further embodiment.
Figure 15:
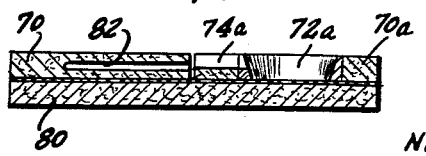
Figure 15 is a cross section taken through a mold cavity and a co-aligning stick bore.

A further embodiment is shown in the Figures 14 and 15 wherein the three elements, that is, the center section and the two side sections have been combined into opposite sections 70, 70a. Sections 70 and 70a are of equal size and dimension and have disposed therein pluralities of cavities 72, 72a similar to the cavities hereinbefore described. However, the slots 74 and 74a both communicate with the respective cavities and the inner side of the respective sections 70 and 70a. As in the embodiments hereinbefore described, pins 76 co-align with eyes 78 that are affixed to base 80. It will be noted that the pins 76 are disposed within and extend from the section 70. Section 70a of course has co-aligning bores, not shown, which receive the pins 76. When the sections 70 and 70a are united or disposed adjacent one to the other wherein the pins 76 reside with their complemental bores, when the slots 74a in the section 70a co-align with stick supporting bores 82 that are located within the section 70. The cavities and slots 72a, 74a are offset from the cavities 72 and slots 74 so that a stick, not shown, may be disposed in each of the bores 82 and supported and secured therein when the sections 70, 70a are assembled. The bores are of such depth as to properly position the sticks and secure them within their related cavities during the casting operations.

In a similar manner, stick supporting bores, not shown, are disposed intermediate each of the slots 74a in the section 70a and co-align with the slots 74 in section 70.

Thus it is apparent that there has been provided a device in which the several objects of the invention are achieved and which is well adapted to meet the conditions of practical use.

While there have been shown and described several embodiments of the invention, it is to be understood that modifications and changes might be made without departing from the scope of the present invention, except as limited by the claims.

The invention claimed is:

1. A confectionary mold comprising a member having plural mold cavities therein, a slot associated with each cavity and extending from the cavity to the margin of said member, means for concurrently positioning a plurality of sticks in secured aligned relation with the slots and the cavities, and ejection means co-aligning with said mold cavities for pressing cast confection out of said cavities.

2. A confectionary mold comprising two members each having plural mold cavities therein, slot-forming means communicating with and terminating at a common side of each member at one end and terminating at the other end with the respective mold cavities, and stick supporting and securing means disposed within the respective members for supporting and securing plural sticks in co-aligning relation with said slot-forming means.

3. A confectionary mold comprising two members each having plural mold cavities therein, slot-forming means communicating with and terminating at a common side of each member at one end and terminating at the other end with the respective mold cavities, and stick supporting and securing means disposed within the respective members for supporting and securing plural sticks in co-aligning relation with said slot-forming means, and means for securing the two members one to the other wherein the respective stick supporting means and cavities are secured in said co-aligned relation.

References Cited in the file of this patent

UNITED STATES PATENTS

| | | |
|---|---|---|
| 746,971 | Marchiony | Dec. 15, 1903 |
| 829,097 | Crabb | Aug. 21, 1906 |
| 934,310 | Hedrick | Sept. 14, 1909 |
| 1,312,325 | Hinck | Aug. 5, 1919 |
| 1,661,227 | McAllister | Mar. 6, 1928 |

FOREIGN PATENTS

| | | |
|---|---|---|
| 29,295 | Great Britain | Dec. 31, 1904 |
| 426,373 | Germany | Mar. 9, 1926 |